United States Patent [19]

Fukuhara

[11] Patent Number: 4,591,860
[45] Date of Patent: May 27, 1986

[54] LORAN-C RECEIVER

[75] Inventor: Hiroshige Fukuhara, Yokosuka, Japan

[73] Assignee: Nissan Motor Company, Limited, Japan

[21] Appl. No.: 608,575

[22] Filed: May 4, 1984

[30] Foreign Application Priority Data

Jun. 7, 1983 [JP] Japan .................................. 58-101444

[51] Int. Cl.⁴ ................................................ G01S 1/24
[52] U.S. Cl. .................................................... 343/390
[58] Field of Search ........................ 343/389, 390, 388; 364/452

[56] References Cited

U.S. PATENT DOCUMENTS

| 3,934,254 | 1/1976 | Vogeler et al. | 343/390 |
| 3,947,849 | 4/1976 | Fehiner | 343/389 |
| 4,166,275 | 8/1979 | Michaels et al. | 343/389 |
| 4,224,623 | 9/1980 | Mercer et al. | 343/390 |
| 4,268,830 | 5/1981 | Brodeur . | |
| 4,468,668 | 10/1984 | Brodeur | 343/389 |

FOREIGN PATENT DOCUMENTS 58-72073 4/1983 Japan .................................. 343/389

OTHER PUBLICATIONS

O'Halloran et al., "Use of Loran-C in AVM and C² Systems," 1980, Carnahan Conference on Crime Countermeasures, University of Kentucky, May 14–16, 1980.

Primary Examiner—Theodore M. Blum
Assistant Examiner—David Cain
Attorney, Agent, or Firm—Lowe, Price, Leblanc, Becker & Shur

[57] ABSTRACT

In a loran-C radio receiver, tracking of the loran-C signal is initiated by sampling the carrier wave intensity of the loran-C signal at a high frequency over two pulse modulation cycles of the loran-C signal and storing the values recorded in each cycle of the sampling frequency in a corresponding memory cell. The sampled values are stored by adding one to the corresponding memory cell if the sampled signal polarity is positive and subtracting one from the given cell, which is initialized to a known value, when the sample has a negative polarity. This sampling over two loran-C cycles is then repeated numerous times, so that after such repetion, each memory cell, corresponding to a specific phase of the loran-C signal, will either have the known value, indicating no carrier wave peak, or a value significantly greater than the known value, indicating a carrier wave peak and so a loran-C pulse. Coordination between the carrier wave and the sampling process is achieved by a multiple sample pulse with a period matching that of the carrier wave, each pulse of the multiple sample pulse being separate from others by ¼-or ⅛-of the carrier wave period and the first of the multiple pulses being synchronized with a zero-crossing point of the carrier wave.

10 Claims, 23 Drawing Figures

LORAN-C RECEIVER

BACKGROUND OF THE INVENTION

This invention relates to a receiver applicable to loran-C, a well-known hyperbolic navigation technique, and more particularly, a loran-C receiver which tracks a specified cycle of the carrier of the received loran signal pulses.

Loran-C employs a chain of a single master station and two or more secondary stations. The master station generates 9 loran pulses, as shown at M in FIG. 1(a) of the attached drawings while the secondary stations each transmit 8 loran pulses, as shown at $S_1$, $S_2$ in FIG. 1(a). These pulse groups of the master and secondary stations are all repeated at the same, fixed frequency. Each of the secondary stations transmits a loran pulse group with a specified time lag (coding delay) from transmission of the loran pulse group from the master station. The coding delay of one secondary station is different from that of the other secondary station of the same chain.

The loran-C receiver finds the difference between the distances from the fixed positions of the master and secondary stations on the basis of the reception time lags of the secondary station pulses relative to the master station pulses, and identifies the position of the receiver from two hyperbolic curves between the master station and each of the secondary stations. In order to find the reception time lag of the secondary master pulses with respect to the master station pulses, the receiver also locates a specified cycle (generally, the third cycle) of the carrier of each of the received station pulses and automatically tracks the specified cycle.

The carrier Ca of the loran pulses, as shown in FIGS. 1(b) and 1(c) which show FIG. 1(a) on a progressively expanded time scale, has a frequency of 100 KHz and a period of 10 $\mu$sec.

One prior art loran-C receiver having the above-mentioned functions is disclosed in examined Japanese patent publication No. 56-2312, published on Jan. 19, 1981. This receiver uses a pair of sample pulses $P_1$, $P_2$ separated by 2.5 $\mu$sec, as shown in FIG. 2(b) to locate the third cycle of the loran pulse carrier Ca, as follows: The period of the pulses $P_1$, $P_2$ matches the repetition period of the loran pulses LP (in the Japanese maritime province, 99.7 msec), and the pulses $P_1$, $P_2$ are shifted backwards in phase toward the leading edge of the loran pulse LP in steps of one period (10 $\mu$sec) of carrier Ca from the point at which the sample pulses are synchronized with the pulse LP.

After the sample pulses $P_1$, $P_2$ no longer coincide with loran pulse LP, the sample pulse pair is shifted in additional 30 $\mu$sec backwards so that they precede the loran pulse LP by at least 30 $\mu$s, as shown in FIG. 2(b). Then, as shown in FIG. 2(c), the direction of movement of the sample pulse ($P_1$, $P_2$) pair is reversed and the sample pulse pair is shifted stepwise toward the loran pulse LP in steps of 10 $\mu$sec. After the pulse pair again reaches the leading edge of loran pulse LP, which allows the position of the third cycle of the carrier Ca (about 30 $\mu$sec backward of the leading edge of loran pulse LP) to be recognized, the tracking of the third cycle begins.

In this receiver, each time the sample pulse pair ($P_1$, $P_2$) is moved by one step, the presence of carrier Ca is checked, so that a plurality of samples of the received signal must be taken. In order to improve the S/N ratio of the received loran pulses LP, the number of samples of the received signal taken after each shift of the sample pulse pair should be maximized. When the S/N ratio is 0 dB or less, measurement must be taken tens to hundreds of times to ensure accurate readings.

This prior art receiver, however, uses only one pair of sample pulses, so that it takes a long time to locate the third cycle of carrier Ca. Furthermore, when the first detected loran pulse LP is a space wave of the loran signal reflected by the ionized layers of the atmosphere, it takes a longer time to detect the third carrier cycle: the space wave has a time lag of about 40—hundreds of $\mu$sec with respect to the surface wave of the loran signal. The space wave is less attenuated during propagation than the surface wave, so that it has a higher intensity at the receiver than the surface wave. If the sample pulse pair $P_1$, $P_2$ is initially synchronized with the space wave of the loran signal at a point, for example, 300 $\mu$sec after the leading edge of the surface wave, 30 or more steps of the sample pulse pair and tenshundreds of measurements of the received signal for each step would be required to locate the leading edge of the surface wave and thus it would take tens of seconds—several minutes to locate the third cycle of the carrier.

In addition, if the position of a moving vehicle with a loran receiver such as mentioned above is desired to be measured, the problem mentioned above can not be neglected since the surface wave is greatly attenuated in city streets or inter-mountain areas, and hence the S/N ratio of the received signal tends to be less than 0 dB.

Moreover, when the vehicle travels through areas such as tunnels where the loran-C electromagnetic waves are not available, the sample pulses will lose synchronization with the loran pulse carrier, so that it may take tens of seconds to several minutes until position measurement again starts after the vehicle has passed through a tunnel, which would be very inconvenient.

SUMMARY OF THE INVENTION

It is therefore an object of this invention to provide a loran-C receiver which shortens the time required to locate and start tracking a specified cycle of the carrier wave modulated to form the pulses of the received loran-C signal and locates and tracks the specified carrier cycle with excellent accuracy even when the S/N ratio of the received signal is low.

Briefly, according to the invention, the loran-C receiver includes a sample pulse generator which produces a group of sample pulses synchronized with the received loran pulses. Sample means samples the loran pulses by a reception unit. The sampled data values of the loran pulse are stored in a memory. A carrier cycle determiner determines whether the sampled data values exceed a predetermined reference value and for recognizing presence of the carrier of the loran pulses for each cycle of the carrier on the basis of the determined results. A specified cycle determiner finds a specified cycle of the loran pulse carrier on the basis of the sensed carrier, thereby allowing the specified carrier cycle to be tracked by a specified cycle tracking unit.

The above and other objects, features and advantages of this invention will be made apparent by the following description of a preferred embodiment thereof, taken in conjunction with the accompanying drawings.

BRIEF DESCRIPTION OF THE PREFERRED EMBODIMENT

Figure 9:
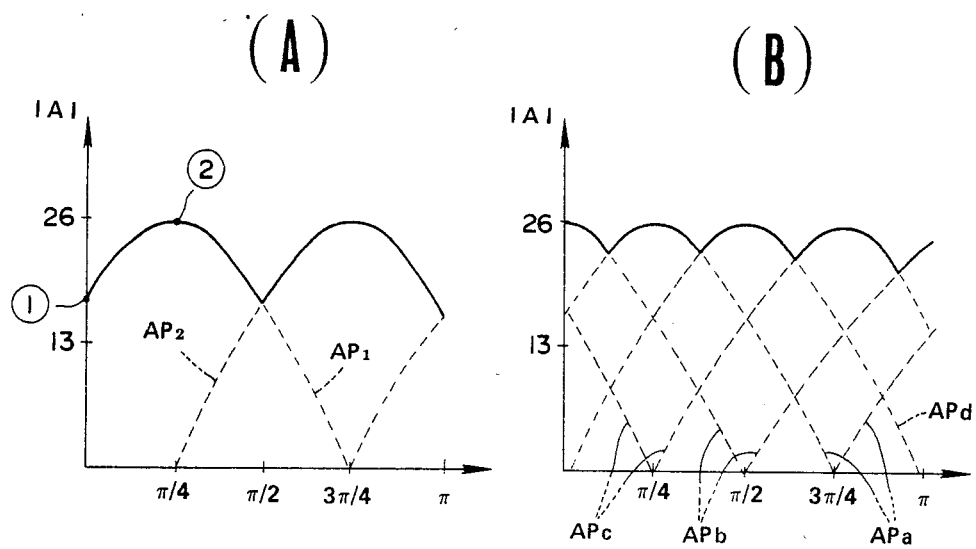
Figure 10:
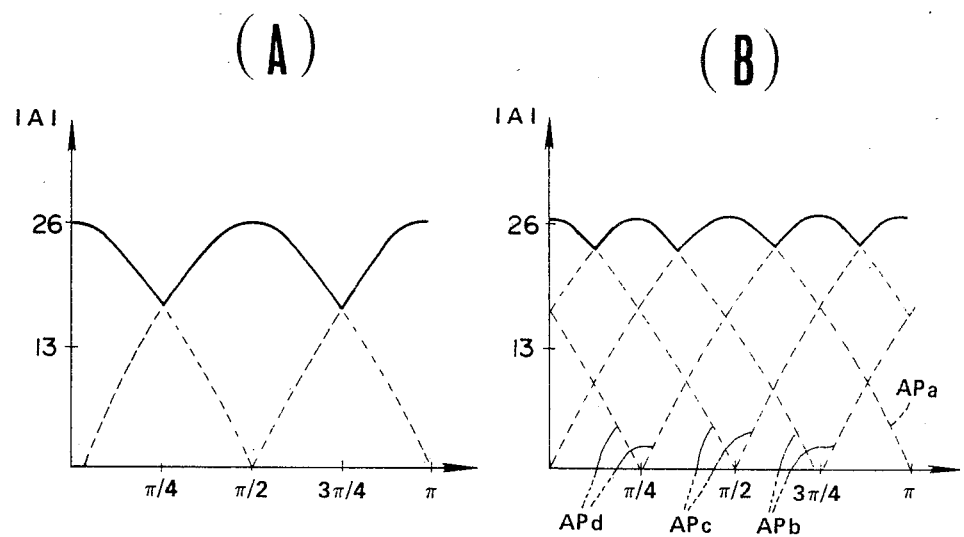

FIGS. 9(A) and 9(B) respectively illustrate changes in the sums of the data values sampled by a set of two sample pulses and a set of four sample pulses, when the frequency of pulses generated by the clock generator is in accurate; and FIGS. 10(A) and 10(B) respectively illustrate changes in the sums of the data values sampled by a set of two sample pulses and a set of four sample pulses when the frequency of pulses generated by the clock generator is completely accurate.

DETAILED DESCRIPTION OF THE PREFERRED EMBODIMENT

Figure 3:
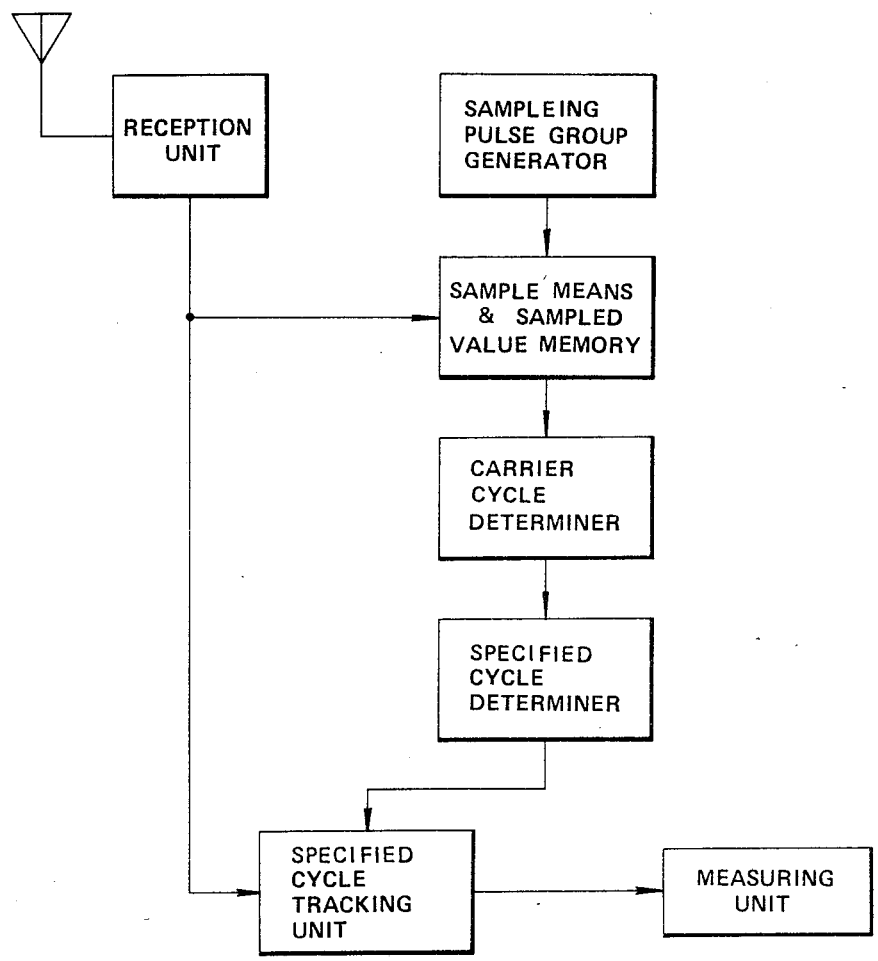
FIG. 3 is a block diagram of the basic concept of this invention.

Referring to FIG. 3 of the accompany drawings, there is illustrated a basic concept of this invention described previously in the summary of the invention.

Figure 4:
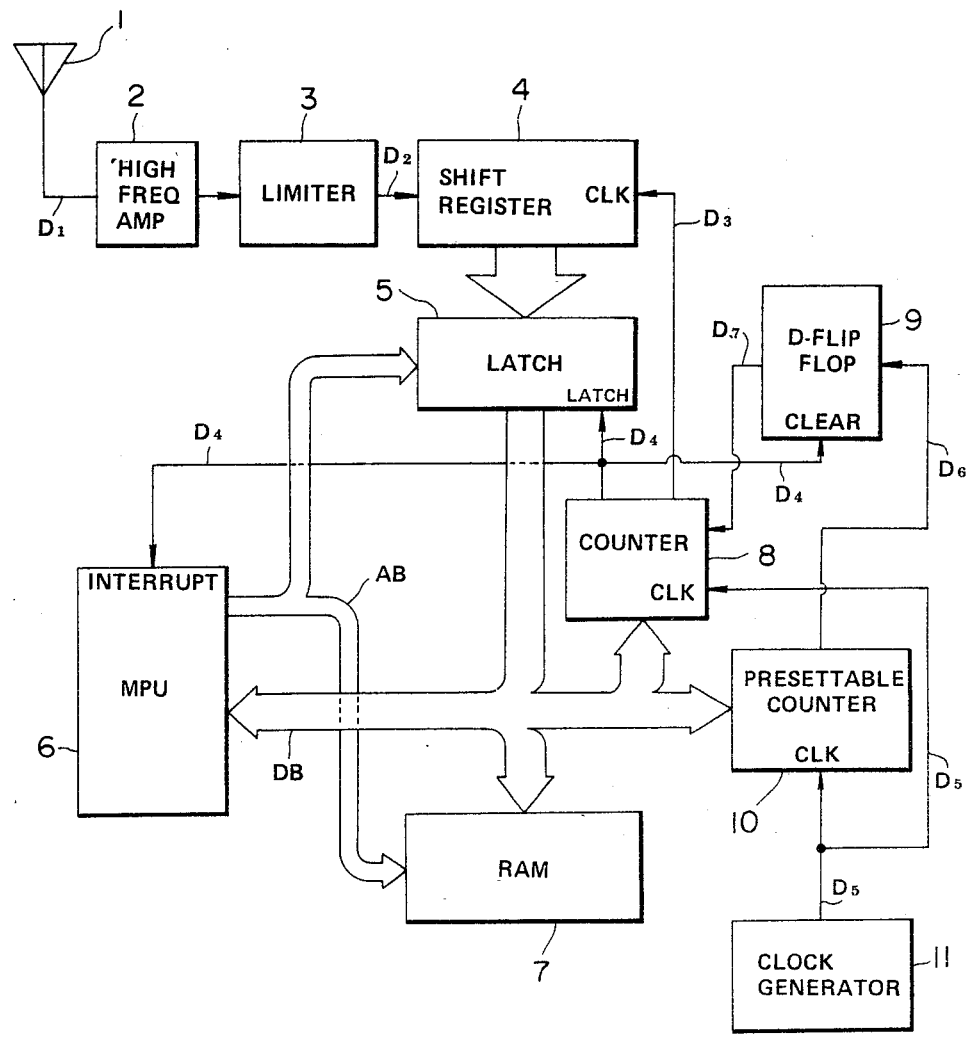
FIG. 4 is a detailed block diagram of a preferred embodiment of a loran-C receiver according to this invention.

Referring to FIG. 4, there is shown in block diagram a preferred embodiment of a loran-C receiver according to this invention. The other structural portions of the receiver such as a unit for initial detection of the loran-C signal, a unit for tracking the zero crossing of the carrier of the loran-C pulses, etc., are well known and so will not be shown or described.

In the figure, a high-frequency amplifier 2 amplifies a signal $D_1$ including the loran-C signal received by an antenna 1 and supplies the amplified signal to a limiter 3 which shapes the amplified signal into a binary signal $D_2$ reflecting the polarity of the received signal.

A shift register 4 has a capacity of k bits (for example 80 bits) and periodically samples the binary signal $D_2$ from limiter 3 in accordance with sample pulses PS from a counter 8. A latch 5 latches the accumulated bit outputs of shift register 4, and more particularly latches the 80-bit values in response to a pulse $D_4$ from counter 8 when shift register 4 has finished sampling the loran pulses.

A microprocessor (referred to as MPU hereinafter) 6 supplies address signals via an address bus AB to latch 5 and a random-access memory (referred to as RAM hereinafter) 7 and supplies and/or receives various data values to and from pertinent devices via a data bus DB. When MPU 6 receives a pulse $D_4$ at its "interrupt" terminal from counter 8, it reads the data values stored in latch 5 and transfers them to RAM 7 for storage.

A clock generator 11 delivers a clock signal $D_5$ synchronous with the carrier Ca of loran-C signal to a presettable counter 10 and counter 8.

Presettable counter 10 counts clock pulses up to a predetermined number indicated by the data values sent by MPU 6 and supplies its count output $D_6$ to a D-flip-flop 9. The output $D_7$ of D-flip-flop 9 is "1" after receiving the count output $D_6$ from counter 10 and returns to "0" when it receives at its "clear" terminal a pulse $D_4$ from counter 8.

Counter 8 divides by M the frequency of clock signal $D_5$ inputted to its "CLK" terminal while the output $D_7$ of D-flip-flop 9 supplied to counter 8 is "1", and supplies a train $D_3$ of pairs of sample pulses PS with an inter-pulse interval of 2.5 μsec to a clock terminal "CLK" of shift register 4. Counter 8 also divides by N the frequency of clock signal $D_5$ and supplies the resulting pulses $D_4$ to a terminal "LATCH" of latch 5, "INTERRUPT" terminal of MPU 6 and a terminal "CLEAR" of D-flip-flop 9.

In the shown embodiment, the relationships $N > M$ and $k = 2N/M$ hold. Description will be made hereinafter as $N = 400$, $M = 10$, and $k = 80$. That is, shift register 4 has a capacity of 80 bits, counter 8 outputs a pair of sample pulses PS every 10 μsec and also outputs a single pulse $D_4$ every 400 μsec.

Figure 5:
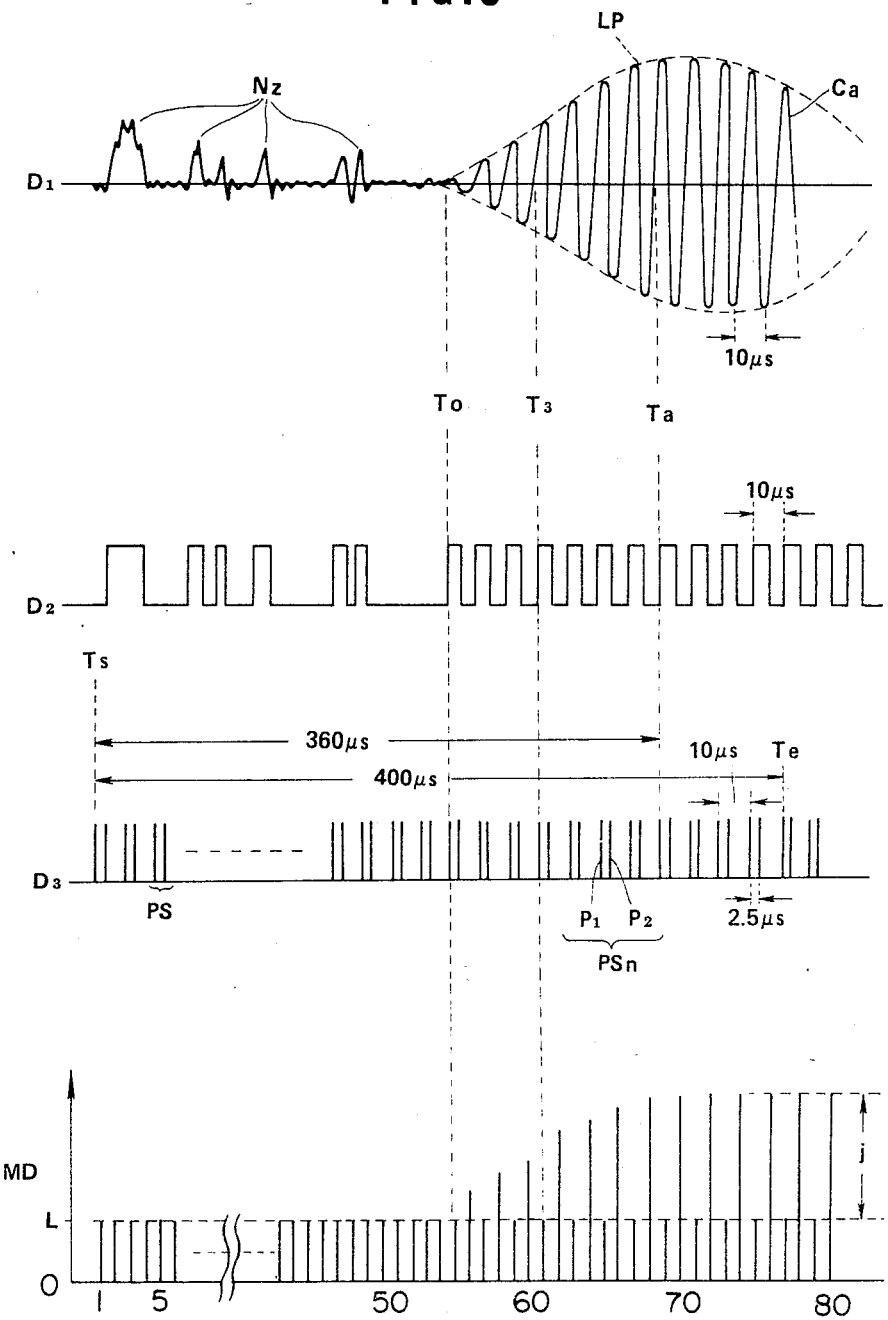
FIG. 5 is a diagram of waveforms illustrating the operation of the receiver of FIG. 4.

Assume that the received signal $D_1$ has a low S/N ratio and contains loran pulses LP and noise NZ, as shown at $D_1$ in FIG. 5. Also, assume that the loran pulse tracking unit of the receiver attains an initial synchronism at a point Ta of loran pulse LP and thereafter tracks the loran signal. The received signal $D_1$ is shaped by limiter 3 into the binary signal, shown at $D_2$ in FIG. 5.

Figure 6:
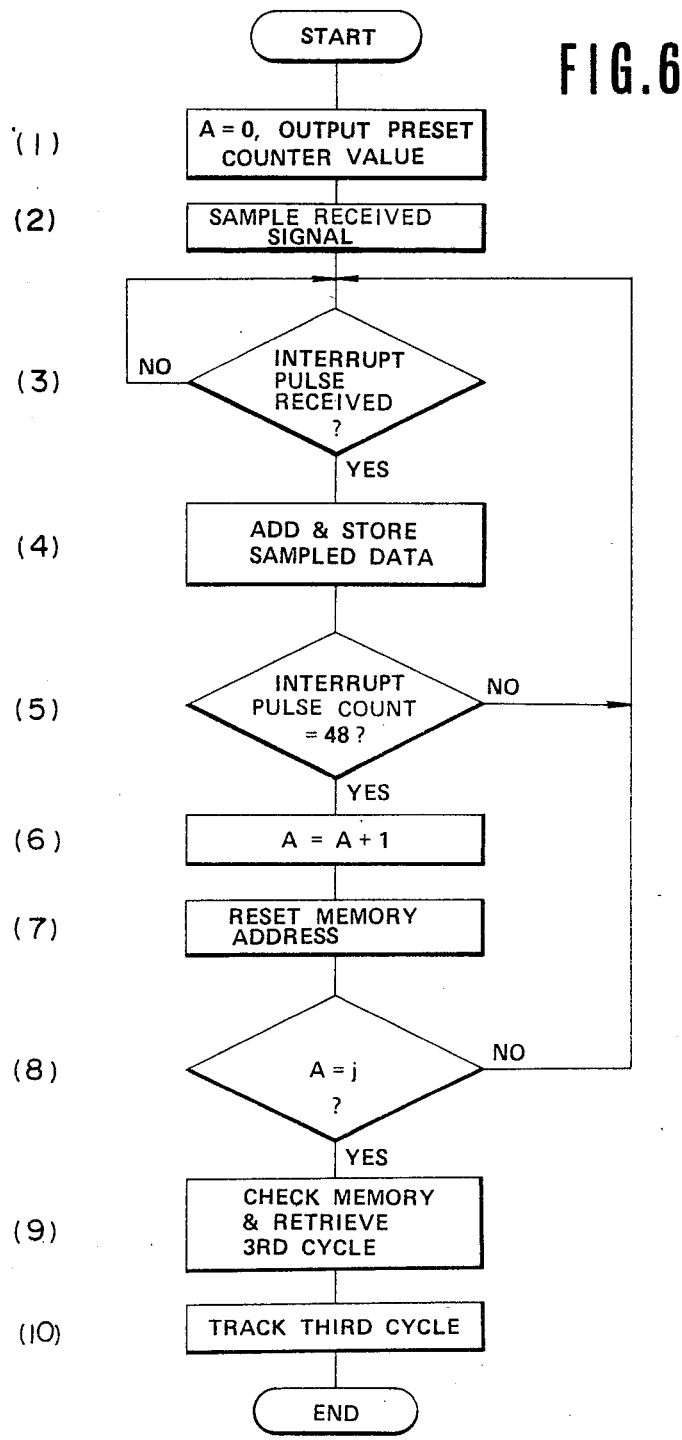
FIG. 6 is a flowchart of the process executed by a microprocessor of the receiver according to this invention.

FIG. 6 shows the program executed by MPU 6 after the loran pulse LP has been detected and a zero-crossing point of the carrier Ca has been identified at a time Ta, as described above. Only the part of this program used to locate the third cycle of each loran pulse is shown in detail.

A sample cycle count A in RAM is reset and presettable counter 10 is supplied with a preset data value at an initial step (1). Thus, D-flip-flop 9 is supplied with a count output $D_6$ from counter 10 for 400 μsec from a time point Ts (refer to $D_3$ in FIG. 5) which is 360 μsec ahead of the initial synchronism point Ta of loran pulse LP in the illustrated example. This causes counter 8 to output 40 pairs of sample pulses PS over the 400 μsec following time point Ts, each pair of sample pulses having an inter-pulse separation of 2.5 μsec and being outputted at a period of 10 μsec, as shown by $D_3$ in FIG. 5. Each sample pulse causes shift register 4 to sample the output signal $D_2$ of limiter 3 at a step (2).

When shift register 4 has produced 80 sampled data values, counter 8 produces a pulse $D_4$ at time point Te which is 400 μsec after Ts. This pulse $D_4$ causes latch 5 to latch the data values (80 bits) sampled by shift register 4, also causes the output $D_7$ of D-flip-flop 9 to go to "0", thereby stopping the operation of counter 8. Pulse $D_4$ is also fed to the interrupt terminal of MPU 6, so that a loop at step (3) of FIG. 6 is exitted. In the subsequent step (4), the 80-bit sampled-data values latched in latch 5 are loaded by MPU 6 into predetermined addresses of RAM 7.

RAM 7 has sufficient address capacity to store two sampled data values for every 10 μsec over two loran pulse modulation cycles, i.e. twice 99.7 msec. That is, in the particular embodiment, since 80 samples are taken for each loran pulse, 2×80 times of sampling is effected for two periods of a single loran pulse. Each station transmits 8 pulses (exclusive of the 9th pulse of the master station), and the number of master and secondary station signals to be received is 3 in all, so that 3,840 (=80×2×8×3) bits of memory in all are required. If a one-byte memory location is used for each sampled bit, then a memory capacity of 3,840 bytes is required.

At a step (5), an interrupt cycle count is checked for equality to the value 48. That is, steps (3)–(5) are repeated 48 times and hence 80 bits of sampled data is stored in RAM 7 for each of the 48 pertinent pulses present in two cycles of the received loran signal.

After a complete set of 3,840 sampled data values has been stored, sample cycle counter A is incremented by one at a step (6), and the memory addresses are reset to their initial values at a step (7).

At a step (8), the sample cycle count A is checked to see if it has reached a predetermined value j. If not, steps (3)–(8) are repeated. This means that the loran signal level at each of the 3,840 instances of sample pulse PS over two loran cycles, i.e. one sample cycle, will be sampled and tallied j times in succession in the corresponding locations of RAM 7. These memory locations are previously loaded with a predetermined data value L. When the value of a sampled data to be stored is "1" (when the data value of the received signal $D_2$ is at the HIGH level when sampled), the corresponding memory location is incremented by one, whereas when the value of a sampled data to be stored is "0" (when the data value of the received signal $D_2$ is at the LOW level when sampled), the corresponding memory location is decremented by one in step (3) of FIG. 6.

In this way, the preset value L is incremented or decremented j times, so that the respective memory locations are as shown at MD in FIG. 5, which shows the contents of memory derived after sampling and adding the received signal level at the same phase through j cycles through steps (3)–(5).

As shown in FIG. 5, since the zero crossing of the carrier Ca has been located at time point Ta during initial detection of the loran pulses, the above 80 sample pulses PS are in sychronism with carrier Ca. Thus, if the $n^{th}$ sample pulse pair PSn of the sample pulse pairs PS has sampled the loran pulse LP such that the first pulse $P_1$ of the pair PSn coincides with the zero-crossing point of carrier Ca and that the other pulse $P_1$ of the pair PSn coincides with the peak of carrier Ca, (pulses $P_1$ and $P_2$ have an inter-pulse interval of ¼-period of carrier Ca), the contents of memory locations which correspond to sample pulses synchronous with the zero-crossing points of carrier Ca are still L and the contents of memory locations which correspond to sample pulses synchronous with the peaks of carrier Ca are L+j.

Since the rising edges of the limiter output $D_2$ can shift slightly due to random electrical and thermal effects, the probability that the data values derived by sample pulses synchronous with the zero-crossing points of carrier Ca will be "1" or "0" can be regarded as being ½. Also, the probability that the data values derived by sample noise areas outside of loran pulses LP are "1" or "0" can be regarded as being ½ so long as the noise NZ is truly random and so follows a Gaussian distribution. Thus, after j cycles of incrementation or decrementation, the numbers of incrementation by 1 and decrementation by 1 will be substantially equal in these cases, so that the respective resulting memory contents will be essentially unchanged from the initial value L.

If the phase codings of loran pulses LP are out of 180° with those of loran pulses LP shown in FIG. 5, the sum of the data values derived by sampling the loran pulse peaks will be L−j, while the other memory locations will still be L, thereby assuring distinction between loran pulses and noise.

In fact, the surface wave and the space wave of the loran signal may interfere and differ in phase, even in which case, one of pulses of the pair will reliably sample the peaks in carrier Ca, thereby ensuring accurate operation of the receiver.

The sums of sampled data values of loran pulses LP stored in the memory locations are shown as differing at MD in FIG. 5. This is because the S/N ratios of the individual carrier wave peaks differ; as the S/N ratio decreases, the probability of the sampled data being in error increases, so that the contents of the memory may be less than L+j or greater than L−j. Even in this case, as long as the loran pulses are present and the number of sample cycles j is sufficiently large, the final memory contents will necessarily be recognizably greater or less than L, so that loran pulses LP can be distinguished from noise. That is, the contents of the memory locations are compared to predetermined reference levels (L±Δl). If the memory contents are within L±Δl, it can be judged that "this is not a loran pulse", while otherwise, it can be judged that "this is a loran pulse". The value of Δl is determined in accordance with the sample cycle count j and the S/N ratio of the loran pulses LP.

The discrimination between loran pulses LP and noise NZ is performed at a step (8) of FIG. 6. That is, the contents of the memory locations are sequentially checked to detect the third cycle $T_3$ of carrier Ca. The edge To of loran pulse LP can be recognized from the corresponding memory contents and then the timing of the third cycle $T_3$ can be calculated from the frequency of carrier Ca and the position of the leading edge To of loran pulse LP. The time required to check the memory contents is about 0.1–0.2 sec according to the processing speed of a typical 8-bit microprocessor.

When the third cycle of carrier Ca is detected, it is tracked at a step (9). The above processing is effected on the loran pulses from the master and two secondary stations to determine the position of the vehicle as explained previously.

Figure 1:
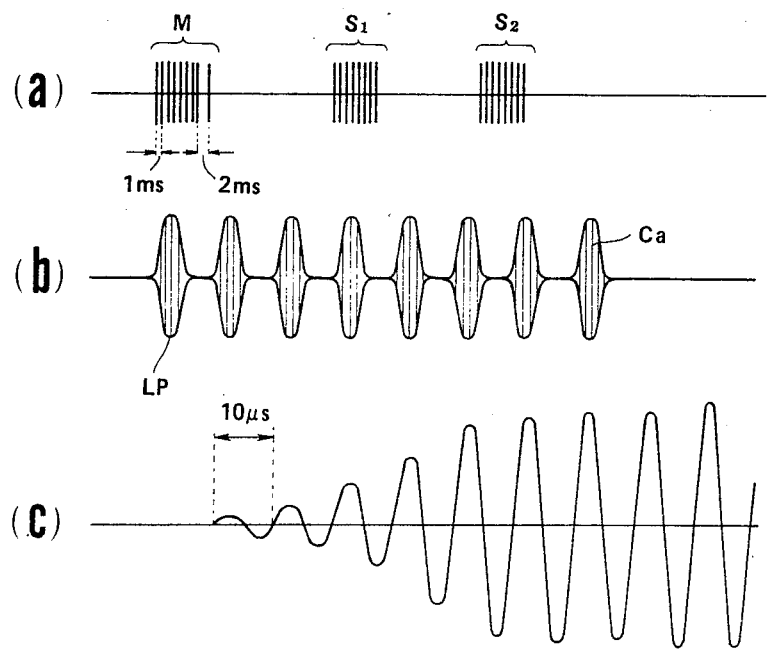
FIG. 1 is a diagram of a loran-C signal on three different time scales.
Figure 2:
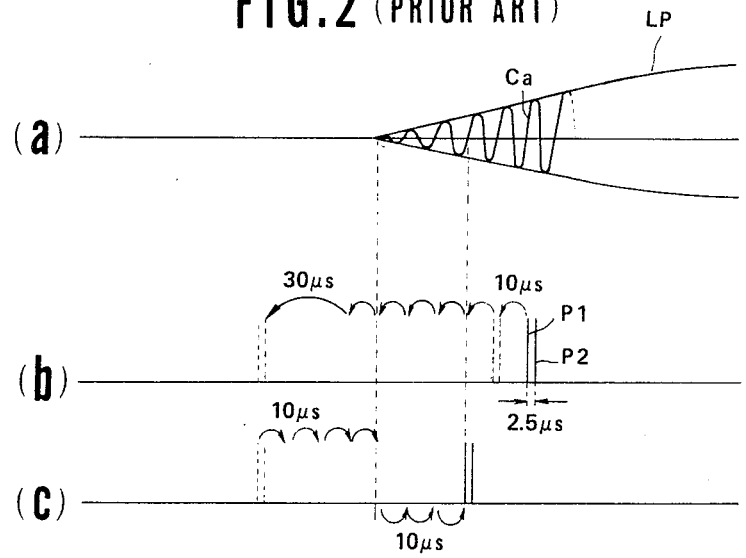
FIG. 2 illustrates detection of a specified cycle of the loran pulses.

In the above embodiment, since a plurality of sample pulses are used to sample the received signal, the time required to detect the third cycle of carrier Ca is much shorter than in prior-art receivers. In more detail, assume that in the prior-art loran-C receiver described with respect to FIG. 2, 100 samples are taken for each stepwise movement of the pair of sample pulses and that the initially detected tracking point of the loran pulses is in synchronism with the space wave of the loran signal 300 μsec behind the leading edge of the loran pulse. Thus, 30 or more sample pulse shifts and 100 sample cycles for each shift are required to detect the third carrier cycle, so that the time required to detect the third cycle is $$30 \times 100 \times (1/80) \approx 37.5 \text{ sec}$$

considering the fact that 80 samples are taken each sec, since the loran pulses are separated by one millisecond.

In contrast, according to this embodiment of this invention, under the same conditions, the time required to detect the third cycle of carrier Ca is $$100 \times (1/80) \approx 1.25 \text{ sec}$$

This results from the fact that the detection of the third carrier cycle according to this invention is effected by a single cycle of processing using 40 pairs of sample pulses while the prior art receiver performs repeated movement of a pair of sample pulses. The sum of the times required to complete the above processing and other data value processing is less than 1.5 sec.

In the above embodiment, although the tracking point may be at any point of loran pulse LP after the loran pulse is initially detected, the time required for detection of the specified cycle is constant.

In the above embodiment, the period over which each group of sample pulses is produced is described as being 400 μsec, but may be changed to another appropriate value, taking into consideration the maximum time lag between the space wave and the surface wave in order to improve the receiver performance.

Figure 7:
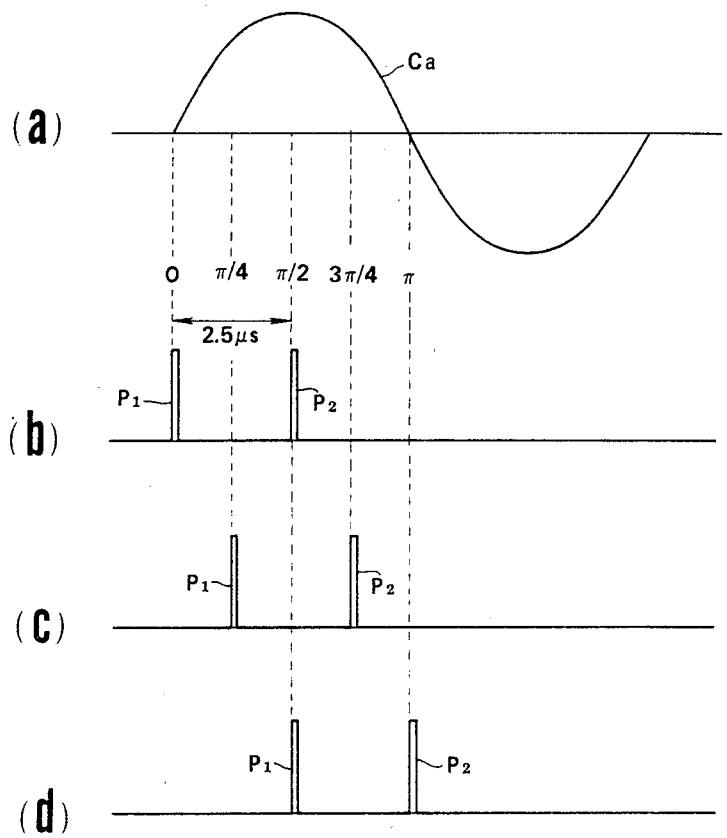
FIG. 7 illustrates possible phase deviations of the sample pulses relative to the carrier in the first embodiment of this invention.

In the above embodiment, a plurality of pairs of sample pulses, each pair of sample pulses having an inter-pulse distance of 2.5 μsec are generated. However, this method can be modified in order to improve the accuracy of detection which will be described below. As shown in FIG. 7(b), when one sample pulse $P_1$ of the pair is in synchronism with the leading edge of carrier Ca, the other sample pulse $P_2$ of the pair samples the peak of carrier Ca. Thus, the result of totalling the data values sampled by j successive pulses $P_2$ is great compared to other portions, as shown at MD in FIG. 5. However, this applies only when sample pulse $P_1$ is in synchronism with the peak of carrier Ca. In this way, setting of the inter-pulse interval to 2.5 μsec (¼ wavelength of carrier Ca) and synchronizing one sample pulse of the pair with the peaks of carrier Ca enables accurate sampling carrier Ca.

As described above, when a pair of sample pulses are synchronized with excellent accuracy, there is no problem. However, if clock generator 11 of FIG. 4 includes a temperature-compensated crystal oscillator, the frequency stability of this oscillator is usually ±1 ppm, so the frequency may deviate by as much as ±1 μsec. This causes the phenomenom described below.

The modulation period of the loran-C signal is about 0.1 sec in the Japanese maritime province. Thus, N sample cycle takes $0.1 \times (N-1)$ sec during which the clock signal $D_5$ generated by clock generator 11 may deviate by as much as $\pm 1$ μsec $\times 0.1 \times (N-1) = \pm 0.1 \times (N-1)$ μsec.

Assume that the sample cycle count N is 26 and that clock signal $D_5$ loses 1 μsec per sec. Then, after 26 sample cycles (2.5 sec), the pair of sample pulses will deviate by ¼-wavelength of carrier Ca from the initial synchronized state.

As is apparent from the above, the sum of data values sampled by the sample pulses depends on the accuracy of clock generator 11. As a result, the sum of the data values sampled by sample pulses initially synchronized with the peaks of the carrier Ca will not be L+j such as shown in FIG. 5, but a lower value.

In addition, after a pair of sample pulses have been synchronized with loran pulse LP in order to effect the initial tracking, it may be that neither of the sample pulses $P_1$, $P_2$ of the pair is synchronized with the peaks of carrier Ca due to the above-mentioned error, as shown in FIG. 7(c). In such a case, it is difficult to detect the peaks of the carrier from the sum of data sampled by these sample pulses.

Figure 8:
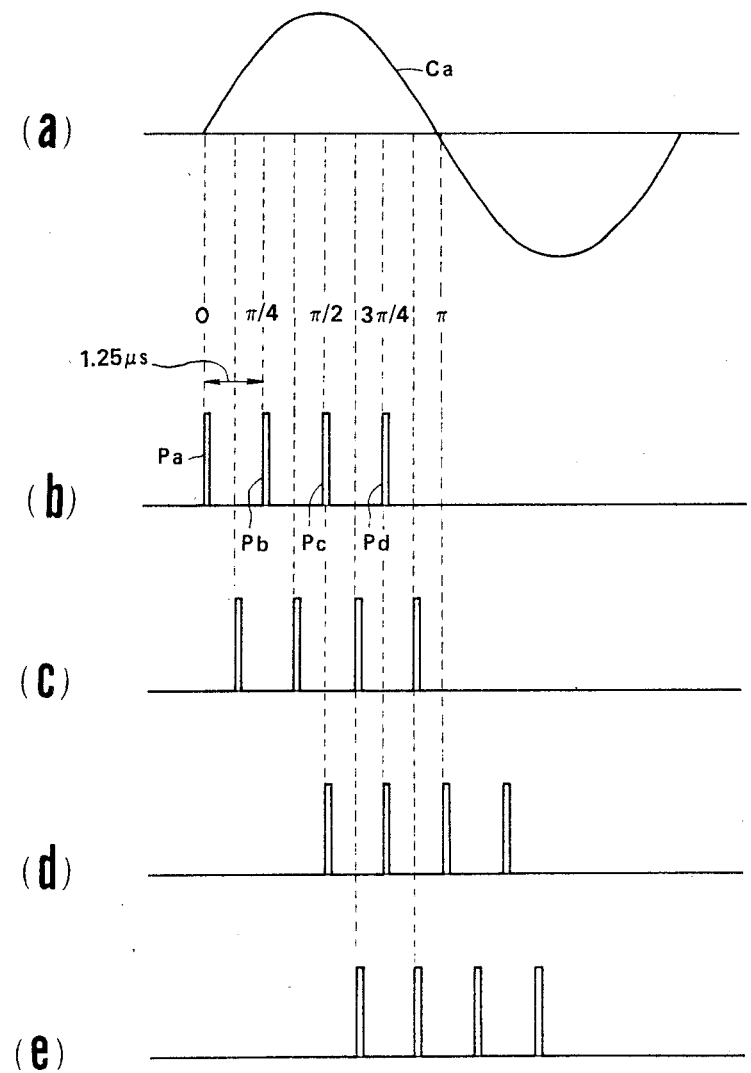
FIG. 8 illustrates possible phase deviations of the sample pulses relative to the carrier in another embodiment of this invention.

However, the use of a set of four sample pulses Pa, Pb, Pc and Pd with an inter-pulse interval of 1.25 μsec (⅛ wavelength of carrier Ca) in synchronism with carrier Ca, as shown in FIG. 8, in place of the pair of sample pulses $P_1$, $P_2$ solves the problem. That is, even if the phases of the set of sample pulses deviate due to the accuracy of clock generator 11, one of the sample pulses will coincide with the peaks of carrier Ca.

After the initial tracking stage where the set of four sample pulses are synchronized with loran pulse LP after detection of the loran pulse, even if the sample pulses deviate in phase from the carrier Ca of the loran pulses due to errors in the receiver, the set of four sample pulses can sense the peaks of carrier Ca with excellent accuracy.

For example, when clock generator 11 contains an error of ±1 ppm, the sums of data values derived by use of a plurality of pairs of sample pulses and a plurality of groups of four sample pulses as in the previous and present embodiments, respectively, are shown in FIGS. 9(A) and (B) where the sums of data values sampled in response to one of each pair or group of sample pulses are greater than the sums of data values sampled by the other sample pulses of the pair or group, so that recognition of the peaks of carrier Ca is possible.

In FIG. 9(A), reference is made to a curve $AP_1$ which represents the sum of data values derived by successive leading sample pulses $P_1$. After loran pulse LP has been detected and the initial synchronism between the sample pulses $P_1$ and loran pulse LP is completed, assuming the sample pulse $P_1$ is synchronized with the leading edge of carrier Ca, i.e. there is no phase difference between sample pulse $P_1$ and carrier Ca, the phase difference between the sample pulses $P_1$ and loran pulse LP is zero in the first sample cycle. During subsequent sample cycles, the phase difference between sample pulse $P_1$ and the leading edge of carrier Ca gradually increases due to the error involved in clock generator 11, so that the sum of data values corresponding to the sample pulses $P_1$ is smaller than its maximum value.

Assume that samples are taken N=26 times. After 26 sample cycles, the phase of the sample pulse $P_1$ shifts by $\pi/2$, so that the sum A of sampled data values is $$A = \sum_{N=1}^{26} \sin\{(N/26) \cdot (\pi/2)\} \approx 17 \qquad (1)$$

normalizing the peak value of carrier Ca to 1. This value A is shown at (1) in FIG. 9(A).

When each sample pulse $P_1$ is initially in synchronism with loran pulse LP with a phase deviation of $\pi/4$, the sum A of sampled data values derived by each sampling $P_1$ in the same way as just mentioned is $$A = \sum_{N=1}^{26} \sin\{(\pi/4) + (N/26) \cdot (\pi/2)\} \approx 25 \qquad (2)$$

This value A is shown at (2) in FIG. 9(A).

As described above, when each sample pulse $P_1$ is initially in synchronism with the leading edge of carrier Ca with a phase deviation of $\pi/4$, the sum A of data values sampled by sample pulse $P_1$ is maximized.

When the sample pulses $P_1$ are $\pi/4$ out of phase with carrier Ca, the sum of data values sampled by each sample pulse $P_2$ is 0. Thus, the difference between the sums derived by sample pulses $P_1$ and $P_2$ is maximized, so that the peaks of carrier Ca can be recognized easily.

In FIGS. 9(A) and 9(B), the absolute values of the sums A of sampled data values are shown. The sum $AP_1$ of sampled data values corresponding to pulses $P_1$ is negative when the phase is greater than $3\pi/4$. Similarly, the sum $AP_2$ of sampled data values corresponding to sample pulses $P_2$ is negative.

Similarly, FIG. 10(A) illustrates the variation of the totalled sampled data derived by sample pulses $P_1$ and $P_2$ when clock generator 11 is wholly accurate. In that case, the sum A is $$A = \sum_{N=1}^{26} \sin\theta$$

where $\theta$ is the phase shift of the sample pulses from carrier Ca.

As is seen from the figure, if the sample pulses are out of synchronism with the leading edge of the carrier, even though there is no error in clock generator 11, the effect of the repeated summation can be relatively small when the sample pulses are shifted by $\pi/4$ or $3\pi/4$ from carrier Ca.

In contrast, when a set of four sample pulses are used as in the second embodiment, the respective sample totals corresponding to sample pulses Pa, Pb, Pc, Pd do not differ so much, which is an advantageous effect, even if there are initial deviations in phase between the sample pulses and carrier Ca when clock generator 11 is accurate to only ±1 ppm, as shown in FIG. 9(B).

Similarly, the effect of the summation does not change significantly if clock generator 11 is absolutely accurate even if there is some initial deviation in phase of sample pulses Pa, Pb, Pc, Pd, as shown in FIG. 10(B).

As described above, if a set of four sample pulses with an inter-pulse interval of 1.25 $\mu$sec are used to sample the carrier Ca, the sums of sampled data values do not change significantly even if the set of sample pulses are shifted in phase from the carrier Ca.

In summary, the loran-C receiver according to this invention shortens the time required to detect a specified cycle of the carrier wave of the loran signal and increases the accuracy of detection.

While this invention has been shown and described in terms of preferred embodiments thereof, it should be noted that this invention is not limited to the embodiments. They are given only for the purpose of illustration. Various changes and modifications could be made by those skilled in the art without departing from the scope of this invention as set forth in the attached claims.

What is claimed is:

1. A loran-C receiver comprising:
   (a) a sample means for producing a plurality of sample pulses in synchronism with each of pulses of the loran-C signal and sampling a received signal containing the loran-C signal in response to each of the sample pulses;
   (b) a memory means for storing sampled values of said received signal sampled in response to each of the sample pulses over a predetermined interval and for adding corresponding sampled values of the received signal for subsequent predetermined intervals to the stored sampled values;
   (c) means for determining whether the stored and added sampled values fall outside a predetermined reference range and for sensing peaks in the carrier wave of the loran-C signal in the received signal on the basis of the determined result;
   (d) means for finding a given peak of the carrier wave in each of the modulated pulse of the loran-C signal.

2. A loran-C receiver comprising:
   (a) a sample means for periodically sampling a received signal containing a loran-C signal in response to sample pulses produced periodically in synchronism with pulses of the loran-C signal to produce sampled data values;
   (b) a memory means;
   (c) a computer means operable for storing said sampled data values at corresponding addresses of said memory means for a predetermined number of periods of said loran-C signal, for adding the sampled data values for the same number of the next periods of said loran-C signal to corresponding sampled data values stored in said memory, for repeating such an adding operation for corresponding subsequent periods of said loran-C signal, for determining whether each of sums of the sampled data values thus obtained is outside a predetermined range, for sensing the carrier of each of pulses of said loran-C signal for each of cycles of said carrier on the basis of the determined results, and for finding a specified cycle of said carrier.

3. A loran-C receiver according to claim 2, wherein said sample means includes a clock generator for producing a clock pulse signal, a frequency divider for receiving the clock pulse signal and for producing the sample pulses, the frequency of which is lower than that of the clock pulse signal, a shift register for receiving the received signal and the sample pulses, for sampling the received signal in response to the sample pulses and producing the sampled data values, and a latch for latching the sampled data values from said register means and for outputting the latched data values in accordance with a periodic command signal.

4. A loran-C receiver according to claim 3, wherein said sample means includes a control means for controlling the timing of generation and termination of the sample pulses, said control means including a presettable counter having a count value preset by said computer and for counting clock pulses up to its preset count value and for outputting a control signal while said presettable counter means is counting to its preset count value, a D-flip-flop responsive to the control signal from said presettable counter for sending a count-enable signal to said frequency divider to cause same to produce the sample pulses while the control signal is present and for causing said frequency divider to stop producing the sample pulses after the output of the control signal has stopped.

5. A loran-C receiver according to claim 4, further including a limiter means for receiving the received signal, for shaping same into a binary signal and for supplying the binary signal to said shift register.

6. A loran-C receiver according to claim 2, wherein each of the sample pulses includes a pair of sub-pulses, the inter-sub-pulse interval of which is less than that of the inter-sample pulse interval, the inter-sub-pulse interval being such that when one of sub-pulse of a pair is at a zero crossing point of the carrier wave of the loran-C signal, the other sub-pulse of the pair coincides with the peak of the cycle.

7. A loran-C receiver according to claim 6, wherein each of the sample pulses includes a set of four equi-spaced sub-pulses, the inter-sub-pulse interval of which is less than that of the inter-sample pulse interval, the inter-sub-pulse interval being equal to one-eighth of the period of the carrier wave.

8. A method of detecting a specified cycle of a carrier wave of a loran-C signal, comprising the steps of:
    (a) periodically sampling a received signal containing a loran-C signal in response to sample pulses produced periodically in synchronism with the carrier wave of the loran-C signal to produce sampled data values;
    (b) storing said sampled data values at corresponding addresses of a memory for a predetermined number of periods of the loran-C signal,
    (c) adding the sampled data values for the same number of the next periods of said loran-C signal to corresponding sampled data values stored in said memory,
    (d) for repeating such an adding operation for corresponding subsequent periods of the loran-C signal, for determining whether each of sums of the sampled data values thus obtained is outside a predetermined range,
    (e) sensing the carrier of each of pulses of said loran-C signal for each of cycles of said carrier on the basis of the determined results, and
    (f) finding a specified cycle of said carrier.

9. A method according to claim 8, wherein each of the sample pulses includes a pair of sub-pulses, the inter-sub-pulse interval of which is less than that of the inter-sample pulse interval, the inter-sub-pulse interval being such that when one of the sub-pulses of a pair is at a zero crossing point of the carrier wave of the loran-C signal, the other sub-pulse of the pair coincides with a peak of the carrier wave.

10. A method according to claim 9, wherein each of the sample pulses includes a set of four equi-spaced sub-pulses, the inter-sub-pulse interval of which is less than that of the inter-sample pulse interval, the inter-sub-pulse interval being equal to one-eighth of the period of the carrier wave.

* * * * *